March 26, 1946.  J. W. PAYNE ET AL  2,397,326
MIXER AND DISTRIBUTOR
Filed July 2, 1943
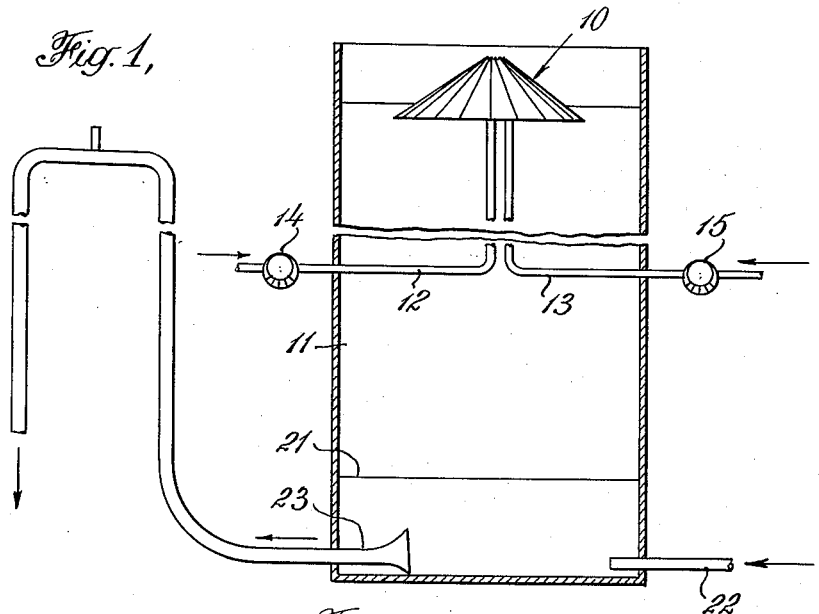
Fig. 1,
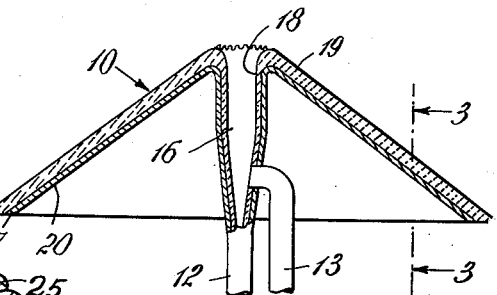
Fig. 2,
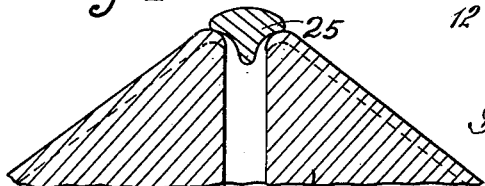
Fig. 4
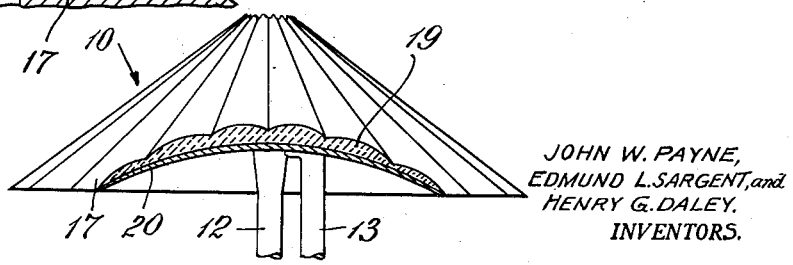
Fig. 3.
JOHN W. PAYNE,
EDMUND L. SARGENT, and
HENRY G. DALEY.
INVENTORS.
BY Oswald G. Hayes
ATTORNEY.

Patented Mar. 26, 1946

2,397,326

UNITED STATES PATENT OFFICE 2,397,326

MIXER AND DISTRIBUTOR

John W. Payne and Edmund L. Sargent, Woodbury, and Henry G. Daley, Woodbury Heights, N. J., assignors to Socony-Vacuum Oil Company, Incorporated, a corporation of New York Application July 2, 1943, Serial No. 493,294

2 Claims. (Cl. 23—285)

This invention relates to apparatus for the preparation and division into streams of a liquid composition tending to form solid gels. As a typical example, the invention relates specifically to apparatus for preparing an aqueous colloidal sol which sets to form a hydrogel containing inorganic oxides as the solid phase.

While the invention may be applied to other processes, its operation and utility are admirably illustrated by discussion in connection with a process for forming globular particles of inorganic oxide hydrogels which may be dried to hard, porous beads suitable for use as hydrocarbon cracking catalyst. Basically, the process for forming catalyst in bead form comprises extruding a sol having a predetermined gelation time into the top of a column of liquid immiscible with the sol and having a lower specific gravity than the sol. The gelation time is so adjusted with respect to the depth and rate of fall of sol globules through the immiscible liquid that the globules set to a firm hydrogel by the time they pass out of the immiscible liquid into a layer of water below. The sol is preferably freshly prepared at the time of extrusion into the oil or other suitable liquid and it is necessary that the two reactant solutions used to prepare the sol be rapidly and completely mixed in a closely controlled ratio in order to form a homogeneous sol having the desired gelation time. Each mixing device must therefore be associated with two metering pumps to supply solutions at carefully controlled rates. It is obviously desirable to divide the sol formed in any mixing device into as large a number of globules as possible. Practically, any stream extruded into the oil is subject to a maximum flow rate for any given globule size. Our prior copending application Serial No. 477,168, filed February 25, 1943, describes means for increasing the capacity of a mixing device by projecting the stream therefrom upon the apex of a grooved cone coated with a material which is not wetted by the sol, for example, a wax. This expedient causes division of flow from a mixing nozzle into a plurality of small streams, each of which breaks up into globules in the oil. Such apparatus is also limited as to capacity by reason of the fact that the mixing nozzle must be small enough that the sol will flow as in a pipe, rather than dropping free. Rapid flow in the mixing nozzle may cause poor division on the cone, but turbulence of flow is essential to adequate mixing. Further, by reason of the fact that all the grooves on the cone must begin in a small area on the apex of the cone below the nozzle, the number of grooves is limited.

We have now designed a combined mixer and distributor which avoids these drawbacks and may be made to provide many more dividing grooves, each of which functions more smoothly than do those of our previously described divider. While the present distributor is shown and described here as adapted for downward flow of gel globules, it is to be understood that it can be inverted in the manner described in our said prior application for upward flow of globules through an immiscible liquid of greater specific gravity than the sol.

According to the present invention, the sol is prepared in a mixing chamber having inlets for reactant solutions at one end and open at the other end. The mixing chamber is preferably conical in shape, being small in diameter at the mixing end to promote good mixing, and large at the discharge end to avoid turbulence. Affixed to and about the open end of the chamber is a distributor which is preferably of generally conical shape and extends divergently away from said open end. Along the surface of the divider are a plurality of grooves extending from the open end of the chamber to the edges of the distributor remote from the chamber. The gelable solution is prepared in the chamber and flows out the open end thereof into the grooves, thus dividing it into a plurality of streams, each of which breaks up into a plurality of globules in the immiscible liquid. Preferably, the surface of the divider contacted by the sol and the interior of the mixing chamber are composed of a substance which is not wetted by the aqueous sol. The waxes in general are suitable for this purpose. Cerese wax and beeswax are highly satisfactory and available in adequate quantity at reasonable prices. The wax or other coating prevents accumulation of gelled material which can build up to such an extent as to seriously interfere with operation of the apparatus; such wax coating is shown on the preferred embodiment of the invention illustrated in the annexed drawing, wherein:

Figure 1 is an elevation in section of apparatus for making hydrogel globules utilizing the principles of the present invention;

Figure 2 is a section through the combined mixer and distributor;

Figure 3 is a section on line 3—3 of Figure 2; and

Figure 4 is a fragmentary section illustrating a modification of the invention.

Referring specifically to Figure 1, a combined mixing chamber and distributor 10 is mounted in the upper part of a vessel 11. Reactant solutions supplied by pipes 12 and 13 from metering pumps 14 and 15 are rapidly and completely mixed in a mixing chamber 16. The mixture of solutions is a sol having a definite gelation time depending on concentration, temperature and pH. The sol flows upwardly through the mixing chamber to the upper open end thereof, which is integral with a conical distributor 17 which has a plurality of grooves in its surface. At the upper end, the grooves appear as a number of lower points in the upper edge of the wall of mixing chamber 16 which act to proportion the total flow of sol among the grooves. For convenience of illustration, the present drawing shows relatively few grooves in the distributor, but in actual practice, a much larger number of grooves are formed. For example, our distributors usually have 48 or more grooves. So far as now appears, the only limit on number of grooves is practicality of forming the grooves and accurately forming the gaps in the wall of the mixing chamber which constitute the upper limits of the grooves.

Preferably, the inner surface of the mixing chamber 16 and the surfaces of distributor 17 subjected to contact with the sol are coated with a substance which is not wetted by the aqueous sol. Cerese wax has been used very successfully for this purpose, but other waxes and substances having similar water repellant characteristics are suitable, for example, chlorinated paraffin wax. The wax coating 18 of the mixing chamber is, of course, continuous with the wax layer 19 which constitutes the upper surface of distributor 17. In the specific embodiment illustrated, the base 20 of the distributor has no grooves, conforming generally to a truncated cone. It is to be understood, of course, that the base may be grooved to conform to the desired surface or may be in any desired form so long as the wax surface corresponds to the principles of the invention discussed above.

The sol discharged down the surface of the distributor 10 passes into a column of oil and each stream thereupon separates into globules which gel as they fall through the oil to a layer of water below the interface indicated at 21. Water admitted by pipe 22 and withdrawn through pipe 23 carries with it the formed hydrogel pellets which are then washed, dried and treated to render them suitable for the desired use.

The modification shown in Figure 4 includes a conical wax dummy 25 inserted in the top of the mixing nozzle to aid in accomplishing even distribution of the sol into the plurality of grooves provided for that purpose.

In a typical example of processes utilizing this invention, a solution of sodium silicate containing 106.5 grams of $SiO_2$ and 33.0 grams of $Na_2O$ per liter was prepared by dilution of a commercial water glass. This solution was admitted by pipe 12 while a 3.90 normal solution of hydrochloric acid was admitted by pipe 13. The reactant solutions were mixed in the ratio of 3.34 volumes of sodium silicate solution per volume of acid solution. The resultant sol flowed down the grooves of the distributor 10 into a nine-foot column of petroleum oil in which the globules formed and gelled before reaching the layer of water below the oil. The globules were then washed and dried to yield hard spheroidal pellets of silica gel.

We claim:

1. In combination, a tank; a mixer and distributor comprising a truncated hollow cone mounted in the upper portion of said tank with the axis of said cone vertical and the apex end uppermost, a wall integral with the surface of said cone at the line of truncation defining a vertical mixing zone along the axis of said cone open at the upper end, the inner surface of said wall being defined by a substance which is not wetted by water, the outer surface of said cone being defined by a substance which is not wetted by water and having a plurality of grooves each beginning at the said line of truncation and extending down the surface of said cone to the perimeter thereof; and separate pipes connected to said wall and opening into the bottom of said mixing zone.

2. In combination, a tank; a mixer and distributor comprising a truncated hollow cone mounted in the upper portion of said tank with the axis of said cone vertical and the apex end uppermost, a wall integral with the surface of said cone at the line of truncation defining a vertical mixing zone along the axis of said cone open at the upper end, the inner surface of said wall being defined by wax, the outer surface of said cone being defined by wax and having a plurality of grooves each beginning at the said line of truncation and extending down the surface of said cone to the perimeter thereof; and separate pipes connected to said wall and opening into the bottom of said mixing zone.

JOHN W. PAYNE.
EDMUND L. SARGENT.
HENRY G. DALEY.